United States Patent
Huang et al.

(10) Patent No.: US 11,171,964 B1
(45) Date of Patent: Nov. 9, 2021

(54) AUTHENTICATION USING DEVICE AND USER IDENTITY

(71) Applicant: Citrix Systems, Inc., Fort Lauderdale, FL (US)

(72) Inventors: Feng Huang, Girton (GB); Ricardo Fernando Feijoo, Davie, FL (US); Tom Kludy, Cooper City, FL (US); John Gavin Ashman, Wareham (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/132,172

(22) Filed: Dec. 23, 2020

(51) Int. Cl.
- H04L 29/06 (2006.01)
- G06F 21/45 (2013.01)
- H04L 9/30 (2006.01)

(52) U.S. Cl.
CPC ............ H04L 63/102 (2013.01); G06F 21/45 (2013.01); H04L 9/30 (2013.01); H04L 63/0876 (2013.01)

(58) Field of Classification Search
CPC ..... H04L 63/102; H04L 9/30; H04L 63/0876; G06F 21/45
See application file for complete search history.

(56) References Cited

U.S. PATENT DOCUMENTS

| | | | | |
|---|---|---|---|---|
| 10,862,880 B1 * | 12/2020 | Massicotte | ............ | H04L 63/062 |
| 2006/0200856 A1 * | 9/2006 | Salowey | ................... | H04L 9/32 726/5 |
| 2008/0109529 A1 * | 5/2008 | Story | ...................... | G06F 16/40 709/217 |
| 2009/0148066 A1 * | 6/2009 | Douma | .................... | G06T 3/40 382/299 |
| 2010/0211795 A1 * | 8/2010 | Brown | ................. | G06Q 20/401 713/176 |
| 2013/0055303 A1 * | 2/2013 | Kannan | ............... | H04L 12/2805 725/25 |
| 2013/0074168 A1 * | 3/2013 | Hao | ....................... | H04L 9/3213 726/7 |
| 2014/0259178 A1 * | 9/2014 | Karaa | ...................... | G06F 8/61 726/27 |
| 2015/0149589 A1 * | 5/2015 | Hao | ......................... | H04L 1/00 709/219 |
| 2015/0237038 A1 * | 8/2015 | Grajek | .................... | H04L 67/10 726/8 |

(Continued)

Primary Examiner — Jason Chiang
(74) Attorney, Agent, or Firm — Banner & Witcoff, Ltd.

(57) ABSTRACT

Methods and systems for secure authentication of users based on unique device identifiers are described herein. A computing device may receive, from a user device, a device registration. The device registration may comprise authentication credentials, device information, and/or a public key. Based on the authentication credentials and/or the device information, a unique device identifier may be generated. A token may be generated based on the unique device identifier and sent to the user device. A request for content may be received from the user device. A nonce may be sent to the user device. The token and a signed version of the nonce may be received from the user device. The nonce may have been signed using a private key corresponding to the public key. Access to the content may be provided based on the token, the unique device identifier, and/or the signed version of the nonce.

20 Claims, 5 Drawing Sheets

(56) References Cited

U.S. PATENT DOCUMENTS

| | | | |
|---|---|---|---|
| 2016/0072904 A1* | 3/2016 | Asnis | H04L 63/0823 |
| | | | 709/224 |
| 2017/0289197 A1* | 10/2017 | Mandyam | H04L 63/06 |
| 2018/0027070 A1* | 1/2018 | Jhanji | H04W 4/08 |
| | | | 709/217 |
| 2019/0258778 A1* | 8/2019 | Park | H04L 63/10 |
| 2019/0333058 A1* | 10/2019 | Hong | G06Q 20/3829 |
| 2020/0092101 A1* | 3/2020 | Ajitomi | H04L 9/3213 |

* cited by examiner

AUTHENTICATION USING DEVICE AND USER IDENTITY

FIELD

Aspects described herein generally relate to computer networking, computer access, virtualization, user authentication, and hardware and software related thereto. More specifically, one or more aspects describe herein provide for integrating aspects of device identity in the user authentication process to improve security and prevent unauthorized use of user credentials.

BACKGROUND

User devices may be provided access to servers based on those user devices presenting access credentials, such as a username and password. So that the user devices need not repeatedly provide the access credentials every instance in which the user device accesses the server, once a user device authenticates with a server, the server may instantiate authenticated sessions for the user device and provide user device with a tokens (e.g., a cookie) which may be used to access the server for a period of time. For example, once a user device successfully logs in to a server with a username and password, the user device may be provided a cookie which allows the user device to access the server for a period of time (e.g., one day, until the user device closes an application, or the like). Such tokens might also be scope limited such that, for example, a token might enable a user device to access only a subset of servers (e.g., only certain Uniform Resource Locators (URLs) without re-authentication.

Given that tokens may be used in lieu of authentication credentials, if a token is intercepted or otherwise acquired by an unauthorized computing device, that unauthorized computing device may use the token to gain unauthorized access to the server. For example, an unauthorized computing device may fraudulently repeat a previous authorized transmission (e.g., one containing a token) to gain unauthorized access to a server. This is one reason why tokens are often time- and scope-limited: by limiting the time period and methodology within which such attacks may occur, the risk that tokens may be maliciously used lessens somewhat. That said, the increasing customer demand for easier forms of user authentication (e.g., long-lived authentication tokens, one-click sign on features, etc.) often makes more aggressive forms of token management undesirable.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards integrating device identification into the user authentication process.

A server may receive, from a user device, a device registration. That device registration may comprise authentication credentials (e.g., a username and a password), device information of the user device, and/or a public key. The public key may correspond to a private key, and both the public key and the private key may have been generated by the user device. The public key may be stored by the server for a period of time, and deleted after the period of time. The server may generate, based on the authentication credentials and based on the device information, a unique device identifier. The server may generate and send, to the user device, a token based on the unique device identifier. The token may comprise a fingerprint of the public key. Such a fingerprint may comprise an identifier of the public key. Moreover, sending the token may be based on a determination, based on the device information, that the user device is of a device type permitted to access the content. The server may receive, from the user device, a request for content. Whereas the device registration may be received via a first URL, the request for content may be associated with access, by the user device, of a second URL. The server may send, to the user device, a nonce. The nonce may be randomly generated by the server. The server may receive, from the user device, the token and a signed version of the nonce. The signed version of the nonce may have been signed using a private key corresponding to the public key. Based on the token, based on the unique device identifier, and/or based on processing the signed version of the nonce using the public key, the server may determine whether to provide the user device access to the content. Determining whether to provide the user device access to the content may comprise determining that the signed version of the nonce was not signed using the private key and preventing the user device from accessing the content. Additionally and/or alternatively, wherein determining whether to provide the user device access to the content may comprise preventing the user device from accessing the content based on a determination that the unique device identifier is not stored by a database.

A user device may generate a public key and a corresponding private key. The user device may send, to the server, a device registration that comprises authentication credentials, device information of the user device, and/or the public key. The device information may uniquely identify an operating system of the user device. The device information may additionally and/or alternatively uniquely identify one or more of: a model of the user device, or a manufacturer of the user device. The user device may receive, from the server, a token generated based on the authentication credentials and/or based on the device information. The token may comprise a fingerprint of the public key, and the fingerprint may comprise an identifier of the public key. The user device may send, to the server, a request for content. While the user device may have sent the device registration via a first URL, the request for content may be associated with access to a second URL. The user device may receive a nonce. The user device may sign the nonce with the private key, then send, to the server, the token and/or the signed version of the nonce. The user device may receive, in response to the token and/or the signed version of the nonce, the content.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
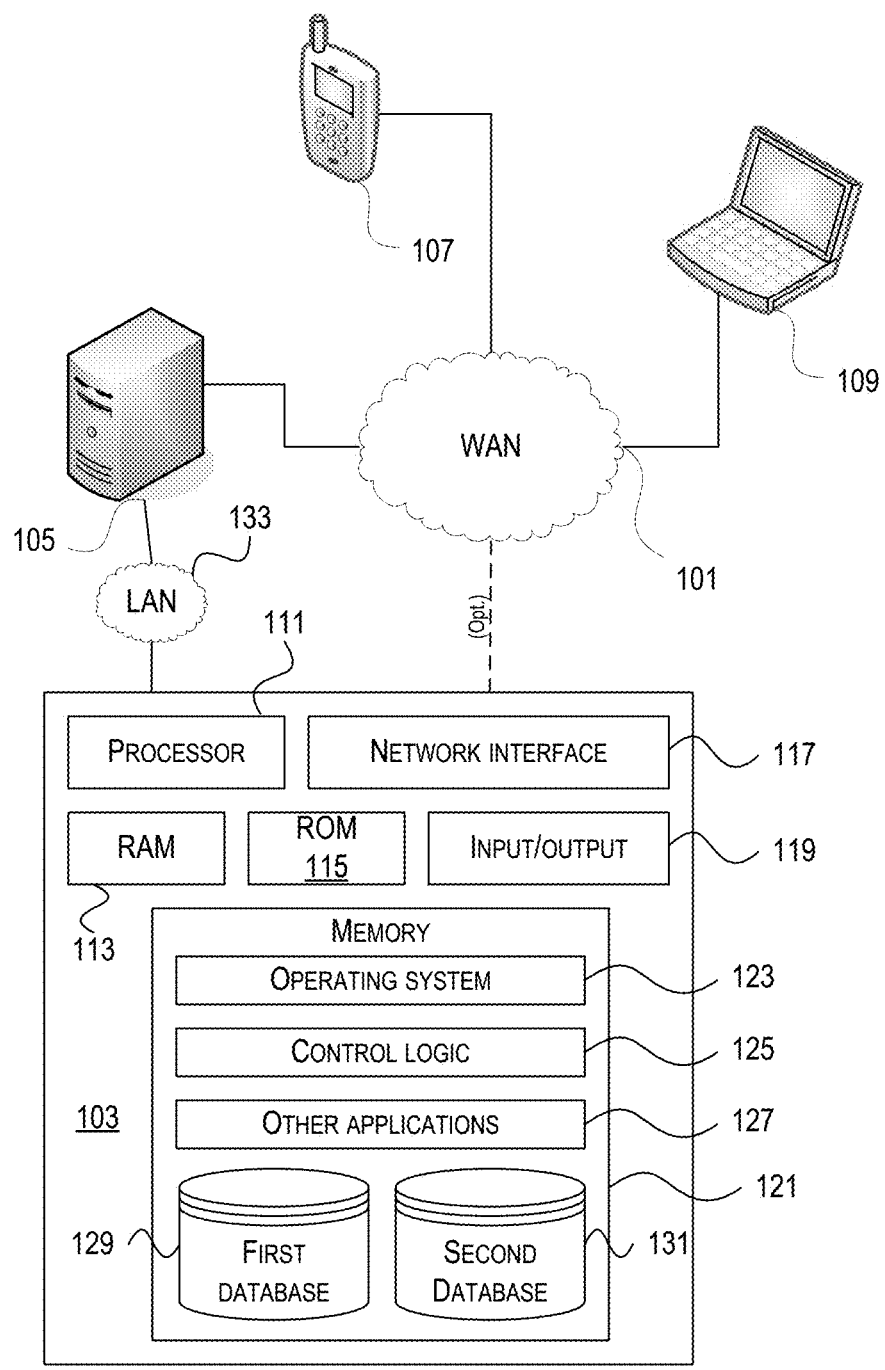
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards integrating device identifications in the process of authenticating a user device. User devices may be provided access to servers based on those user devices presenting access credentials (e.g., a username and password) to the server. For example, to access a banking website, a user might provide a username, a password, and a one-time-use code. Such an authentication process can be cumbersome and time-consuming, particularly in circumstances where the authentication process is designed to be highly secure (and thus, for example, requires multiple or particularly lengthy passwords that take a significant amount of time to enter). So that the user devices need not repeatedly provide the access credentials every instance in which the user device accesses the server (e.g., for every page of a website, for every subdomain of a website, and/or for every website managed by the same entity), once a user device authenticates with a server, the server may instantiate authenticated sessions for the user device and provide user device with a tokens (e.g., a cookie) which may be used to access the server for a period of time. For example, once a user device successfully logs in to a website with a username and password, a web browser executing on the user device may be provided a cookie which allows the user device, via the web browser, to access the server for a period of time (that is, until the cookie expires at a predetermined period of time). That said, given that tokens may be used in lieu of authentication credentials, if a token is intercepted or otherwise acquired by an unauthorized computing device, that unauthorized computing device may use the token to gain unauthorized access to the server. For example, an unauthorized computing device may conduct a replay attack, which entails fraudulently repeating a previous authorized transmission (e.g., one containing a token) to gain unauthorized access to a server. This can be of particular concern where a token might provide that unauthorized computing device access to sensitive information, such as sensitive financial information. Such a concern cannot be easily fixed by, for example, requiring that the user device provide additional information about itself (e.g., a serial number of a web browser): such details can readily be spoofed.

The disclosure herein improves the functioning of computing devices, and in particular the authentication process of computing devices, by integrating device identification into the device authentication process in a manner which adds security to the process and which prevents spoofing (e.g., replay attacks) from nefarious computing devices. The process described herein allows computing devices to authenticate with one another in a manner which avoids cumbersome re-authentication steps while also leveraging the security of device identification into the authentication process. In other words, the process described herein improves the functioning of computing devices when authenticating themselves while also making those computing devices easier to use.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
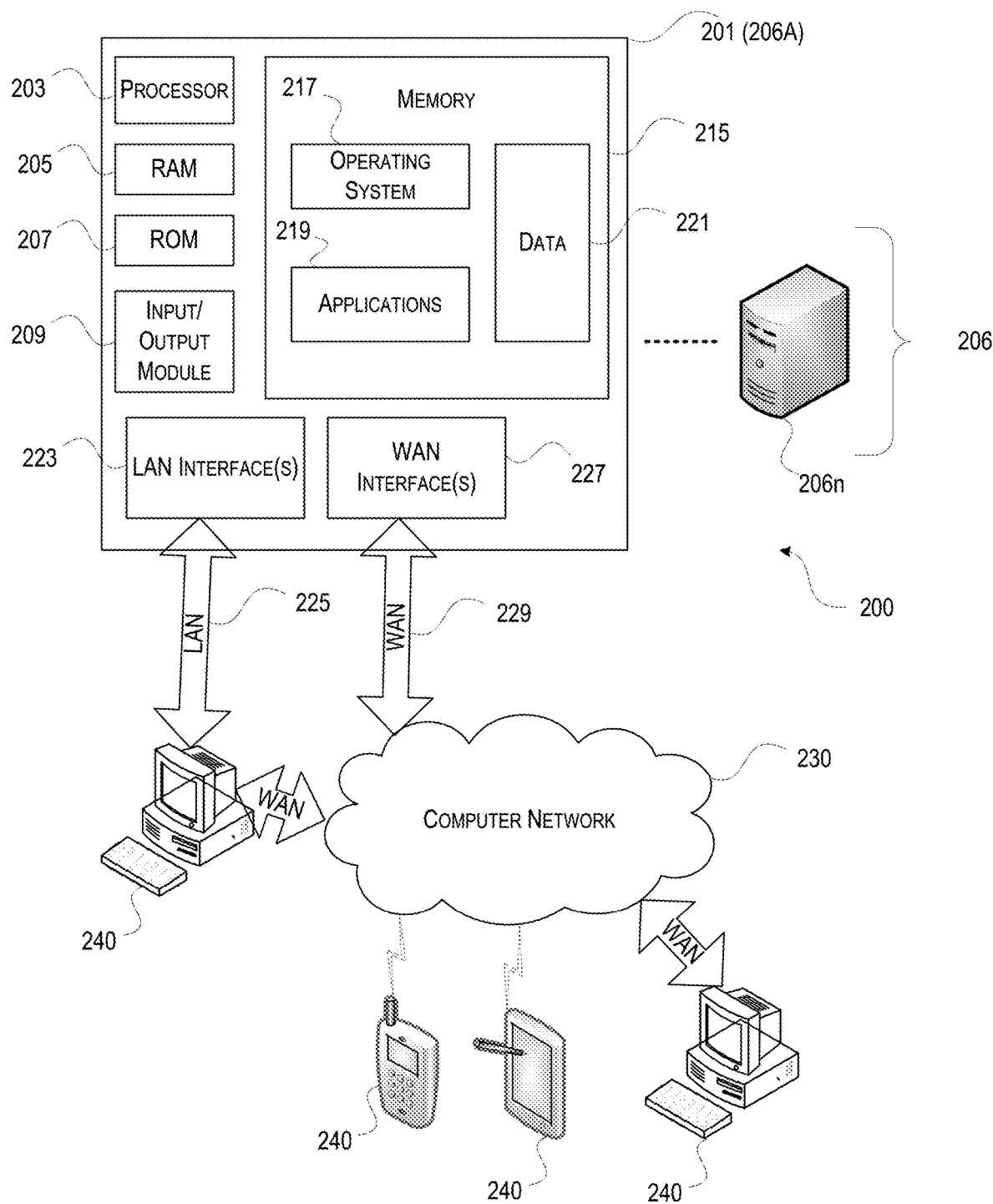
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206*b* (not shown), and responds to the request generated by the client machine 240 with a response from the second server 206*b* (not shown.) First server 206*a* may acquire an enumeration of applications available to the client machine 240 as well as address information associated with an application server 206 hosting an application identified within the enumeration of applications. First server 206*a* can then present a response to the client's request using a web interface, and communicate directly with the client 240 to provide the client 240 with access to an identified application. One or more clients 240 and/or one or more servers 206 may transmit data over network 230, e.g., network 101.

Device Identification Integration into Device Authentication

Figure 3:
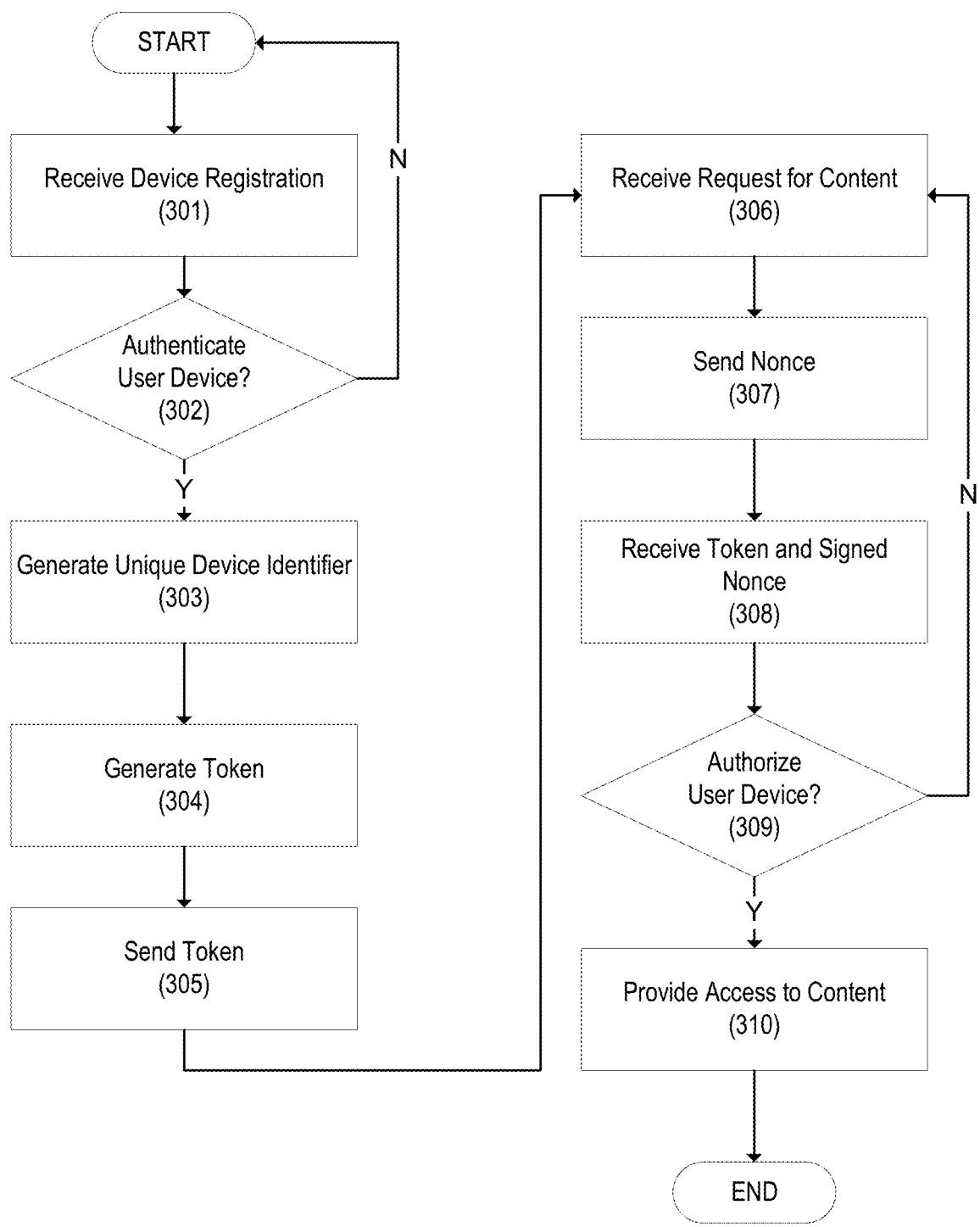
FIG. 3 depicts a flowchart for a server integrating device identity with authentication in accordance with one or more illustrative aspects described herein.

FIG. 3 depicts an illustrative flow chart that may be performed by a server to integrate information about a user device into the process of authenticating that user device. The process depicted in FIG. 3 may be performed by a computing device, such as the server 206, and/or any computing device. For example, the process depicted in FIG. 3 may be performed by a computing device having one or more processors and memory storing instructions that, when executed by the one or more processors, cause the performance of one or more steps depicted in FIG. 3. Though steps depicted in FIG. 3 are shown in a particular order, the steps depicted may be rearranged as desired. For example, one or more steps may be performed between any of the steps depicted in FIG. 3.

In step 301, the server may receive a device registration. The device registration may be received from a user device. The device registration may serve to register the user device with the server, such that the server has information about a device approved to use and be associated with user credentials. The device registration may be received as part of a formal device registration process. For example, the device registration process may entail a user device accessing a URL associated with device registration and logging in using authentication credentials. During the process of device registration, the server may redirect the user device to various URLs. For example, after receiving authentication credentials (as a first part of device registration), the server may redirect the user device to a second URL, and the second URL may be configured to collect device information regarding the user device.

The device registration may comprise authentication credentials, such as a username and password. In this manner, the device registration may comprise credentials which may both authenticate the registration itself, but also provide an indication of which credentials the user device is associated with. The authentication credentials may additionally and/or alternatively be provided separately from (e.g., in a separate transmission from) other aspects of the device registration. For example, the user device might first authenticate with the server using the authentication credentials, then provide other aspects of the device registration (e.g., the device information discussed below). In this manner, the device registration process may be part of a web page which requires authentication to access.

The device registration may comprise device information. The device information may comprise any identifying information about the user device. For example, the device information may comprise operating system information, information about one or more applications executing on the user device (e.g., a type of web browser used to access a web site associated with the server), processing capabilities of the user device (e.g., a brand or type of processor installed in the user device), devices connected to the user device (e.g., models of display devices connected to the user device, a type of input device connected to the user device), or the like. The device information might, for instance, identify a model of the user device and/or a manufacturer of the user device. The type and/or specificity of the device information may depend on the user device. For example, some user devices may be capable of providing comprehensive details about their components (e.g., processor, memory), whereas others might not be capable of doing so due to operating system limitations.

The device registration may comprise a public key. The public key may correspond to a private key, and the public key and the private key may have been generated by the user device. The public key may be stored by the server for a period of time, and deleted after the period of time has elapsed.

In step 302, the server may determine whether to authenticate the user device. Determining whether to authenticate the user device may be based on the device registration. For example, determining whether to authenticate the user device may be based on authenticating the authentication credentials received via the device registration. If the server decides to authenticate the user device, the flow chart proceeds to step 303. Otherwise, the flow chart returns to the beginning and awaits receipt of device registration.

In step 303, and based on determining to authenticate the user device, the server generates a unique device identifier. The unique device identifier may be configured to uniquely identify the user device as compared to other user devices which may be registered with the server. The unique device identifier may be randomly generated. The unique device identifier may additionally and/or alternatively be based on the device information. For example, the server may concatenate one or more portions of the device information to generate the unique device identifier. As another example, the unique device identifier may be a hashed version of the device information. The unique device identifier need not always be generated by the server. The user device itself may generate or otherwise maintain a unique device identifier, and the unique device identifier may be received as part of the device registration.

In step 304, the server may generate a token. The token may be based on the unique device identifier, the authentication credentials, the device information, and/or the public key. For example, the token may indicate a device identity (e.g., by comprising the device identifier and/or some part of the device information) and may comprise user identity information (e.g., the authentication credentials). The token may be a cookie or other similar data element which may be configured for storage by the user device and which may grant the user device subsequent access to the server. The token may be formatted according to a standard, such as a standard for web browser cookies.

As part of generating the token, the token may be stored by the server. In this manner, should the server later receive data purporting to be the token, the server can compare the generated token and the proffered token. If previous tokens are stored and associated with the authentication credentials, the previous tokens may be deleted and/or otherwise modified in view of the newly-generated token.

The token may comprise a fingerprint of the public key. A fingerprint may be any summary or other portion of the public key. The fingerprint may be, for instance, a short series of bytes used to identify a longer public key. For example, the fingerprint may comprise a shorter and/or encrypted version of the public key, a hash of the public key, a portion of a header of the public key, or the like. Providing the fingerprint of the public key in the token may advantageously allow the user device to associate the token with a particular public and private key pair, which may be useful where the user device may maintain numerous such public and private key pairs.

In step 305, the server may send the token to, e.g., the user device. The token may be transmitted to an application (e.g., a web browser) executing on the user device in a manner which causes the user device to store the token. For example, if the token is a cookie, the token may be sent to the user device for storage in a cookie storage area of a web browser executing on the user device. The token may be sent as part of an indication, sent to the user device, that authentication was successful.

As indicated by the structure of FIG. 3, sending the token may be contingent on authentication of the user device in step 302. Such authentication may be based on, for example, authentication credentials presented by the user device. Such authentication may comprise determining that the user device is of a device type permitted to access the content. Certain devices (e.g., public computers in a library, devices known to be particularly insecure) may thereby be prevented from accessing content for security reasons. Similarly, user devices in certain locations and/or lacking in certain processing capabilities (e.g., sufficient processing power to process the content) might not be authenticated for security or user experience reasons. In this way, the token provided in step 304 might not be provided unless, in step 302, the user device is determined to be of a device type permitted to access the content.

In step 306, the server may receive, from the user device, a request for content. The request for content may be associated with access, by the user device, to a URL. For example, the server may detect that a user device has accessed a URL (e.g., a URL associated with content that requires authorization to access). As such, the request for content may comprise a user browsing to a new URL, attempting to access a portion of a server, or the like. The content may be any type of content which may be provided by the server or any other device. For example, the request for content may be received by the server, but may be associated with access, by the user device, to another computing device. As another example, the server performing the steps of FIG. 3 may be configured as a device which provides access, upon successful authentication, to a wide variety of internal servers or computing devices.

In some circumstances, the request for content may comprise a token, but this token alone might be insufficient to provide the user device access to the content. As such, as part of step 306, the server may decide whether to allow the user device access to the content by authenticating only the token. Such a determination might be made based on, for example, the security of the content. For example, low-security content might not be a significant risk for unauthorized access, such that the server might provide access to the low-security content based on the token alone. In contrast, for high-security content, the token alone might be insufficient, as the token might be copied and used by an unauthorized entity. As such, part of receiving the request for content may comprise determining that the content requested is associated with a security level that requires authentication steps above and beyond authentication of a received token.

In step 307, the server may send a nonce to the user device. A nonce may be any randomly generated data element, such as an alphanumeric string. The nonce need not have any particular meaning or content. The length of the nonce may be limited in circumstances where, e.g., the length may cause the nonce to be difficult to encrypt and/or where the nonce is transmitted using data fields that are character-limited. For instance, the nonce may be sixteen characters in length to fit into a sixteen-character-limited header field.

In step 308, the server may receive a token and a signed nonce. The server may receive the token and the signed nonce from the user device. The token may be the same or a different token as compared to the token sent in step 305. For example, the token may be the same as the token generated in step 304 (which may indicate that the same user device is sending the token), or may be a different token as compared to the token generated in step 304 (which may indicate that a different device may be trying to gain unauthorized access to the content). The nonce may be signed using a private key. The nonce may be signed by a private key corresponding to the public key received as part of the device registration in step 301. In this manner, the user device might not only provide a token (which could potentially be stolen in certain circumstances), but may also provide proof that the user device maintains the private key which corresponds to the public key received via the device registration in step 301.

In step 309, the server may determine whether to authorize the user device. Determining whether to authorize the user device may be based on the received token and/or the received nonce. Determining whether to authorize the user device may be based on device information (e.g., device information of a user device as stored in a token) and/or user information (e.g., authentication credentials). As such, determining whether to authorize the user device need not solely be based on any one of the received token, the received nonce, the device information, or the like. If the server decides to authorize the user device, the flow chart proceeds to step 310. Otherwise, the flow chart proceeds back to step 306 and awaits receipt of a request for content.

Determining whether to authorize the user device may be based on a determination that the token received in step 308 matches the token generated in step 304. That said, a difference between the two tokens need not indicate that the device providing the token received in step 308 is trying to gain unauthorized access to the content. For example, the token may be configured to be modified based on a time of day, a location of the user device, or the like. Accordingly, should the received token and the generated token differ, authorizing the user device may comprise determining whether the difference between the received token and the generated token indicates an attempt at unauthorized access to the content.

Determining whether to authorize the device may comprise determining that the received nonce was not signed using the private key. In this manner, the server may deny access to the content based on a determination that the user device did not, in response to receiving a nonce, respond with a properly-signed version of the nonce. As such, determining whether the received nonce was signed using the private key may comprise processing the nonce using the public key.

Determining whether to authorize the user device may comprise determining that the unique device identifier is not stored by a database. When generated, unique device identifiers may be stored in a database for later access. In such a circumstance, if the unique device identifier received from a user device is not stored, this may suggest that the user device is not an authorized user device and/or has not been registered.

Determining whether to authorize the user device may comprise determining that the user device is still registered. User devices might be registered with the server for only a predetermined period of time. In such a circumstance, after the period of time has elapsed, the user device may be required to re-register.

In step 310, the server may provide the user device with access to the requested content. Providing the user device with access to the content may comprise transmitting the content to the user device, transmitting instructions to the user device which instruct the user device on how to access the content, transmitting instructions to another computing device configured to cause the computing device to transmit content to the user device, or the like.

Figure 4:
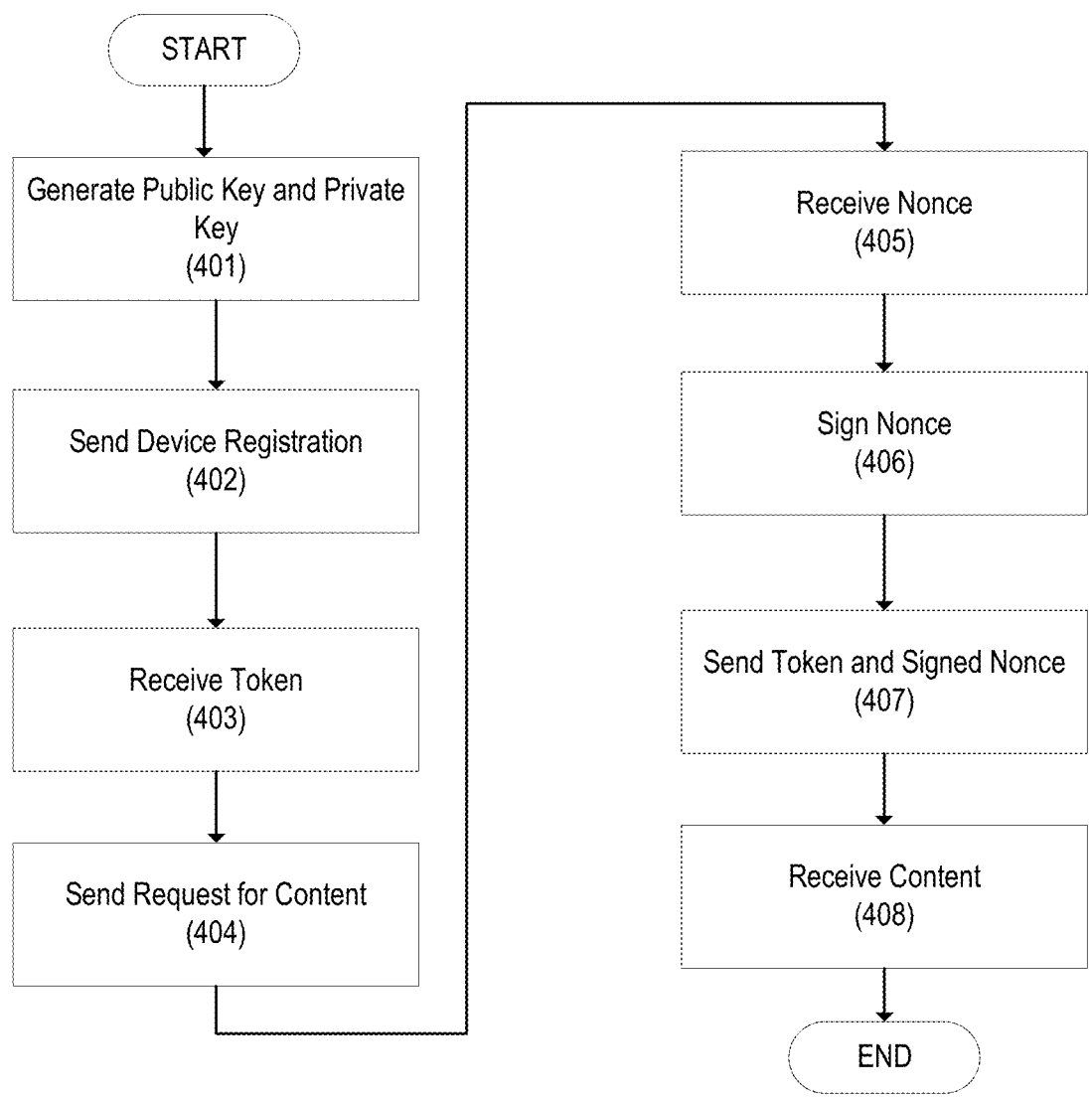
FIG. 4 depicts a flowchart for a user device integrating device identity with authentication in accordance with one or more illustrative aspects described herein.

FIG. 4 depicts an illustrative flow chart that may be performed by a user device to integrate information about the user device into the process of authenticating that user device with a server. The process depicted in FIG. 4 may be performed by a computing device, such as the terminal 240, and/or any computing device. For example, the process depicted in FIG. 4 may be performed by a computing device having one or more processors and memory storing instructions that, when executed by the one or more processors, cause the performance of one or more steps depicted in FIG. 4. Though steps depicted in FIG. 4 are shown in a particular order, the steps depicted may be rearranged as desired. For example, one or more steps may be performed between any of the steps depicted in FIG. 4.

In step 401, the user device may generate a public key and a private key. The public key and the private key may be generated using any cryptographic algorithm or similar code configured to generate public and private key pairs. The private key may differ from the public key in that the private key may be maintained by the user device and not shared with any other computing devices. The public key may be configured to allow devices, such as the server, to decrypt messages that have been encrypted using the private key and/or validate the signature signed by the private key. The public key may also be configured to allow devices, such as the server to encrypt messages targeted for the user device.

In step 402, a device registration may be sent to the server. The device registration may comprise the public key. The device registration may be the same or similar as described with respect to step 301 of FIG. 3.

In step 403, the user device may receive a token from the server. The token may be the same or similar as described with respect to step 304 and 305 of FIG. 3. The user device may be configured to store the token in memory. In this manner, when the user device accesses content from the server (or a different, related server), it may present the token to authenticate itself.

In step 404, the user device may send a request for content. The request for content may be the same or similar as described with respect to step 306 of FIG. 3. The request for content need not be for content on the same server that provided the token. For example, the request for content may be associated with content on a web page hosted on a first server, and the token may have been received by a second server. The request may be associated with access, by the user device, to one or more URLs. For example, the request for content may be associated with the user browsing, using a browser executing on the user device, a web page that requires authentication.

In step 405, the user device may receive a nonce. The nonce may be the same or similar as described with respect to step 307 of FIG. 3. The nonce may be received in response to the request for content sent in step 404. For example, the nonce may be a challenge received in response to the nonce.

In step 406, the user device may sign the nonce using the private key. Signing the nonce may comprise using the private key to sign the nonce in a way that may be decrypted using the public key.

In step 407, the user device may send the token and the signed nonce. The token and the signed nonce may be sent to the server. By sending the token and the signed nonce, the user device may thereby prove not only that it has the token, but may also thereby prove that the user device is in the possession of the private key. Sending the token and the signed nonce may cause the server to receive the token and the signed nonce, as described with respect to step 308 of FIG. 3.

In step 408, the user device may receive the content. The content may be received via a network. The content may be displayed by the user device using, e.g., a display device. Receiving the content may be responsive to the server providing the content, as described in step 310 of FIG. 3.

Figure 5:
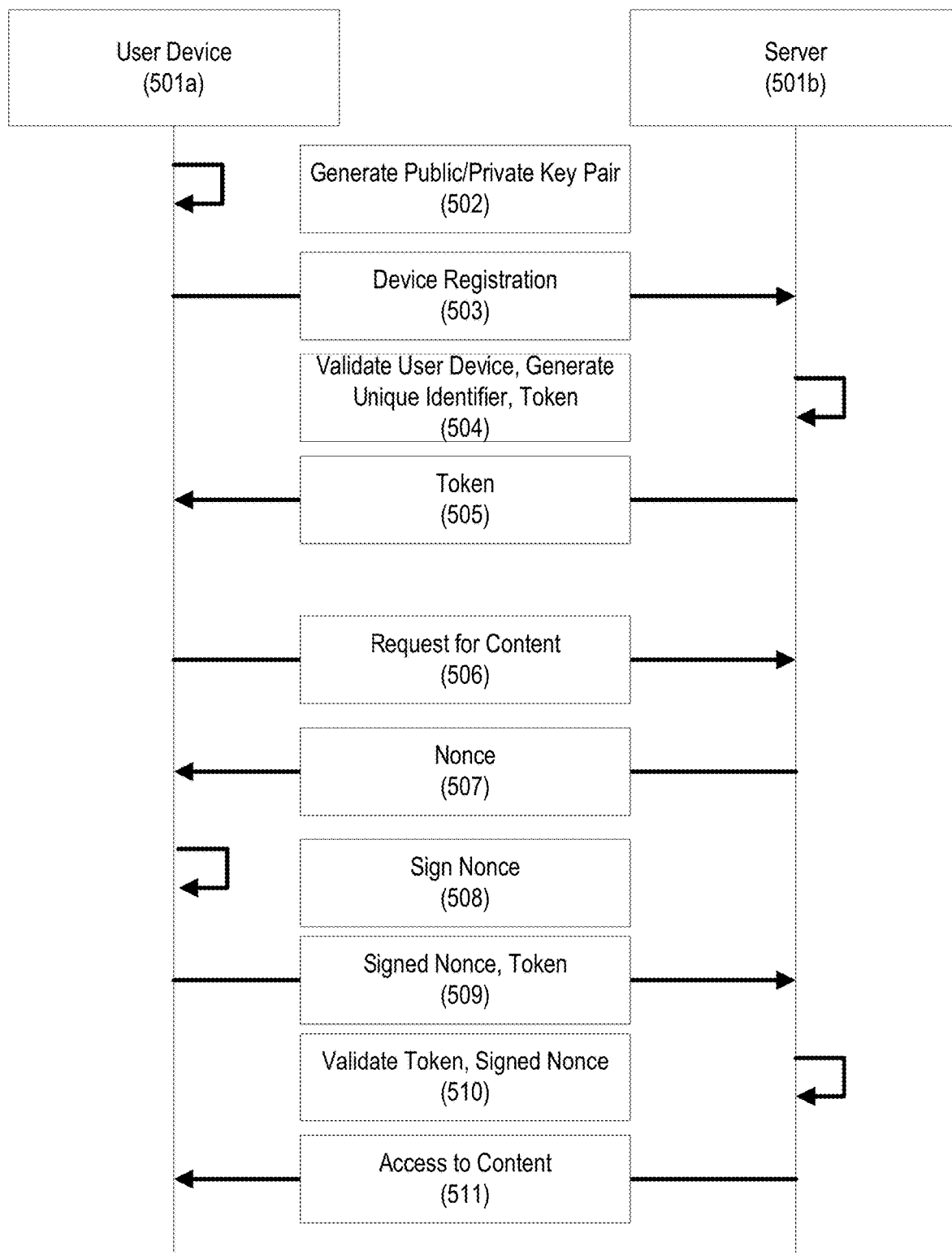
FIG. 5 depicts a messaging flow between a server and a user device in accordance with one or more illustrative aspects described herein.

FIG. 5 is a sequence diagram illustrating communications between a user device 501a and a server 501b. The user device 501a and the server 501b may be the same or similar as the user device and server discussed with respect to FIG. 3 and FIG. 4.

The first set of steps (e.g., step 502 through step 505), describe preliminary steps associated with device registration and authentication. In step 502, the user device generates a public and private key pair. This may the same or similar as step 401 of FIG. 4. In step 503, the user device 501a sends, to the server 501b, a device registration. This may the same or similar as step 402 of FIG. 4. The server 501b then, in step 504, validates the user device, generates a unique identifier, and generates a token. This may the same or similar as steps 302-304 of FIG. 3. The server 501b then, in step 505, sends the token to the user device 501a. This may the same or similar as step 305 of FIG. 3.

The next set of steps (e.g., step 506 through step 511), which might occur much later than the earlier set of steps, describe authenticating the user device 501a again. In step 506, the user device 501a sends a request to content to the server 501b. This may the same or similar as step 404 of FIG. 4. In step 507, the server 501b sends a nonce to the user device 501a. This may the same or similar as step 307 of FIG. 3. The user device 501a, in step 508, signs the nonce with the private key generated in step 502. This may the same or similar as step 406 of FIG. 4. In step 509, the user device 501a sends the signed nonce and the token to the server 501b. This may the same or similar as step 407 of FIG. 4. In step 510, the server 501b validates the token and the signed nonce. This may the same or similar as step 309 of FIG. 3. In step 511, the server 501b provides the user device 501a access to the content. This may the same or similar as step 310 of FIG. 3.

The following paragraphs (M1) through (M20) describe examples of methods that may be implemented in accordance with the present disclosure.

(M1) A method comprising receiving, by a server and from a user device, a device registration including authentication credentials and a public key; generating a token; sending, to the user device, the token; receiving, from the user device, a request for content; sending, to the user device, a nonce; receiving, from the user device: the token; and a signed version of the nonce, wherein the signed version of the nonce was signed using a private key corresponding to the public key; and determining, based on the token and based on processing the signed version of the nonce using the public key, whether to provide the user device access to the content.

(M2) A method may be performed as described in paragraph (M1) wherein generating the token comprises: generating a fingerprint of the public key, wherein the token comprises an indication of the fingerprint.

(M3) A method may be performed as described in paragraph (M2) wherein the thumbnail comprises a portion of the public key.

(M4) A method may be performed as described in paragraph (M1) wherein the device registration further includes device information of the user device, wherein sending the token is based on authorizing the user device, and wherein authorizing the user device comprises a determination, based on the device information, that the user device is of a device type permitted to access the content.

(M5) A method may be performed as described in paragraph (M1) wherein determining whether to provide the user device access to the content comprises: determining that the signed version of the nonce was not signed using the private key; and preventing the user device from accessing the content.

(M6) A method may be performed as described in paragraph (M1) wherein the device registration further includes device information of the user device, and further comprises generating, based on the authentication credentials and the device information, a unique identifier.

(M7) A method may be performed as described in paragraph (M1) wherein determining whether to provide the user device access to the content comprises preventing the user device from accessing the content based on a determination that the unique device identifier is not stored by a database.

(M8) A method may be performed as described in paragraph (M1) wherein the device registration is received via a first Uniform Resource Locator (URL), and wherein the request for content is associated with access, by the user device, of a second URL.

(M9) A method may be performed as described in paragraph (M1) further comprising: storing, by the server, the public key for a period of time; and deleting the public key after the period of time.

(M10) A method comprising generating, by a user device, a public key and a corresponding private key; sending, to a server, a device registration comprising: authentication credentials; device information of the user device; and the public key; receiving, from the server, a token, wherein the token was generated based on the authentication credentials and based on the device information; sending, to the server, a request for content; receiving, from the server, a nonce; signing the nonce with the private key; sending, to the server: the token; and the signed version of the nonce; and receiving, in response to the token and the signed version of the nonce, the content.

(M11) A method may be performed as described in paragraph (M10) wherein the token comprises a fingerprint of the public key.

(M12) A method may be performed as described in paragraph (M11) wherein the fingerprint comprises an identifier of the public key.

(M13) A method may be performed as described in paragraph (M10) wherein the device information uniquely identifies an operating system of the user device.

(M14) A method may be performed as described in paragraph (M10) wherein the device information uniquely identifies one or more of: a model of the user device, or a manufacturer of the user device.

(M15) A method may be performed as described in paragraph (M10) wherein sending the device registration comprises sending the device registration via a first Uniform Resource Locator (URL), and wherein sending the request for content comprises accessing a second URL.

(M16) A method comprising receiving, by a server, from a user device, and via a first Uniform Resource Locator (URL), a device registration comprising: authentication credentials; device information of the user device; and a public key; generating, based on the authentication credentials and based on the device information, a unique device identifier; generating a fingerprint of the public key; generating a token based on the authentication credentials, the unique device identifier, and the fingerprint of the public key; sending, to the user device and based on a determination, based on the device information, that the user device is of a permitted device type, the token; receiving, from the user device, a request for content at a second URL; generating a random nonce; sending, to the user device, the random nonce; receiving, from the user device: the token; and a signed version of the nonce, wherein the signed version of the nonce was signed using a private key corresponding to the public key; and determining, based on the token, based on the unique device identifier, and based on processing the signed version of the nonce using the public key, whether to provide the user device access to the content.$_{[KS1]}$ (M17) A method may be performed as described in paragraph (M16) wherein determining whether to provide the user device access to the content comprises: determining that the signed version of the nonce was not signed using the private key; and preventing the user device from accessing the content.

(M18) A method may be performed as described in paragraph (M16) wherein determining whether to provide the user device access to the content comprises: preventing the user device from accessing the content based on a determination that the unique device identifier is not stored by a database.

(M19) A method may be performed as described in paragraph (M16) further comprising: storing, by the server, the public key for a period of time; and deleting the public key after the period of time.

(M20) A method may be performed as described in paragraph (M16) wherein the fingerprint is an identifier of the public key.

The following paragraphs (A1) through (A20) describe examples of apparatuses that may be implemented in accordance with the present disclosure.

(A1) A server comprising one or more processors and memory storing instructions that, when executed by the one or more processors, cause the server to receive, from a user device, a device registration including authentication credentials and a public key; generate a token; send, to the user device, the token; receive, from the user device, a request for content; send, to the user device, a nonce; receive, from the user device: the token; and a signed version of the nonce, wherein the signed version of the nonce was signed using a private key corresponding to the public key; and determine, based on the token and based on processing the signed version of the nonce using the public key, whether to provide the user device access to the content.

(A2) A server as described in paragraph (A1) wherein the instructions, when executed by the one or more processors, cause the server to generate the token by causing the server to generate a fingerprint of the public key, wherein the token comprises an indication of the fingerprint.

(A3) A server as described in paragraph (A2) wherein the thumbnail comprises a portion of the public key.

(A4) A server as described in paragraph (A1) wherein the device registration further includes device information of the user device, wherein the instructions, when executed by the one or more processors, cause the server to send the token based on authorizing the user device, and wherein the instructions, when executed by the one or more processors, cause the server to authorize the user device based on a determination, based on the device information, that the user device is of a device type permitted to access the content.

(A5) A server as described in paragraph (A1) wherein the instructions, when executed by the one or more processors, cause the server to determine whether to provide the user device access to the content by causing the server to: determine that the signed version of the nonce was not signed using the private key; and preventing the user device from accessing the content.

(A6) A server as described in paragraph (A1) wherein the device registration further includes device information of the user device, and wherein the instructions, when executed by the one or more processors, cause the server to generate, based on the authentication credentials and the device information, a unique identifier.

(A7) A server as described in paragraph (A1) wherein the instructions, when executed by the one or more processors, cause the server to determine whether to provide the user device access to the content by causing the server to prevent the user device from accessing the content based on a determination that the unique device identifier is not stored by a database.

(A8) A server as described in paragraph (A1) wherein the instructions, when executed by the one or more processors, cause the server to receive the device registration via a first Uniform Resource Locator (URL), and wherein the request for content is associated with access, by the user device, of a second URL.

(A9) A server as described in paragraph (A1) wherein the instructions, when executed by the one or more processors, cause the server to: store the public key for a period of time; and deleting the public key after the period of time.

(A10) A user device comprising one or more processors and memory storing instructions that, when executed by the one or more processors, cause the user device to generate a public key and a corresponding private key; send, to a server, a device registration comprising: authentication credentials; device information of the user device; and the public key; receive, from the server, a token, wherein the token was generated based on the authentication credentials and based on the device information; send, to the server, a request for content; receive, from the server, a nonce; sign the nonce with the private key; send, to the server: the token; and the signed version of the nonce; and receive, in response to the token and the signed version of the nonce, the content.

(A11) A user device as described in paragraph (A10) wherein the token comprises a fingerprint of the public key.

(A12) A user device as described in paragraph (A11) wherein the fingerprint comprises an identifier of the public key.

(A13) A user device as described in paragraph (A10) wherein the device information uniquely identifies an operating system of the user device.

(A14) A user device as described in paragraph (A10) wherein the device information uniquely identifies one or more of: a model of the user device, or a manufacturer of the user device.

(A15) A user device as described in paragraph (A10) wherein the instructions, when executed by the one or more processors, cause the user device to send the device registration by causing the user device to send the device registration via a first Uniform Resource Locator (URL), and wherein sending the request for content comprises accessing a second URL.

(A16) A server comprising one or more processors and memory storing instructions that, when executed by the one or more processors, cause the server to receive from a user device, and via a first Uniform Resource Locator (URL), a device registration comprising: authentication credentials; device information of the user device; and a public key; generate, based on the authentication credentials and based on the device information, a unique device identifier; generate a fingerprint of the public key; generate a token based on the authentication credentials, the unique device identifier, and the fingerprint of the public key; send, to the user device and based on a determination, based on the device information, that the user device is of a permitted device type, the token; receive, from the user device, a request for content at a second URL; generate a random nonce; send, to the user device, the random nonce; receive, from the user device: the token; and a signed version of the nonce, wherein the signed version of the nonce was signed using a private key corresponding to the public key; and determine, based on the token, based on the unique device identifier, and based on processing the signed version of the nonce using the public key, whether to provide the user device access to the content.

(A17) A server as described in paragraph (A16) wherein the instructions, when executed by the one or more processors, cause the server to determine whether to provide the user device access to the content by causing the server to: determine that the signed version of the nonce was not signed using the private key; and preventing the user device from accessing the content.

(A18) A server as described in paragraph (A16) wherein the instructions, when executed by the one or more processors, cause the server to determine whether to provide the user device access to the content by causing the server to: prevent the user device from accessing the content based on a determination that the unique device identifier is not stored by a database.

(A19) A server as described in paragraph (A16) wherein the instructions, when executed by the one or more processors, cause the server to: store the public key for a period of time; and delete the public key after the period of time.

(A20) A server as described in paragraph (A16) wherein the fingerprint is an identifier of the public key.

The following paragraphs (CRM1) through (CRM20) describe examples of computer-readable media that may be implemented in accordance with the present disclosure.

(CRM1) A computer-readable media storing instructions that, when executed by one or more processors of a server, cause the server to receive, from a user device, a device registration including authentication credentials and a public key; generate a token; send, to the user device, the token; receive, from the user device, a request for content; send, to the user device, a nonce; receive, from the user device: the token; and a signed version of the nonce, wherein the signed version of the nonce was signed using a private key corresponding to the public key; and determine, based on the token and based on processing the signed version of the nonce using the public key, whether to provide the user device access to the content.

(CRM2) A computer-readable media as described in paragraph (CRM1) wherein the instructions, when executed, cause the server to generate the token by causing the server to generate a fingerprint of the public key, wherein the token comprises an indication of the fingerprint.

(CRM3) A computer-readable media as described in paragraph (CRM2) wherein the thumbnail comprises a portion of the public key.

(CRM4) A computer-readable media as described in paragraph (CRM1) wherein the device registration further includes device information of the user device, wherein the instructions, when executed, cause the server to send the token based on authorizing the user device, and wherein the instructions, when executed, cause the server to authorize the user device based on a determination, based on the device information, that the user device is of a device type permitted to access the content.

(CRM5) A computer-readable media as described in paragraph (CRM1) wherein the instructions, when executed, cause the server to determine whether to provide the user device access to the content by causing the server to: determine that the signed version of the nonce was not signed using the private key; and preventing the user device from accessing the content.

(CRM6) A computer-readable media as described in paragraph (CRM1) wherein the device registration further includes device information of the user device, and wherein the instructions, when executed, cause the server to generate, based on the authentication credentials and the device information, a unique identifier.

(CRM7) A computer-readable media as described in paragraph (CRM1) wherein the instructions, when executed, cause the server to determine whether to provide the user device access to the content by causing the server to prevent the user device from accessing the content based on a determination that the unique device identifier is not stored by a database.

(CRM8) A computer-readable media as described in paragraph (CRM1) wherein the instructions, when executed, cause the server to receive the device registration via a first Uniform Resource Locator (URL), and wherein the request for content is associated with access, by the user device, of a second URL.

(CRM9) A computer-readable media as described in paragraph (CRM1) wherein the instructions, when executed, cause the server to: store the public key for a period of time; and deleting the public key after the period of time.

(CRM10) A computer-readable media storing instructions that, when executed by one or more processors of a user device, cause the user device to generate a public key and a corresponding private key; send, to a server, a device registration comprising: authentication credentials; device information of the user device; and the public key; receive, from the server, a token, wherein the token was generated based on the authentication credentials and based on the device information; send, to the server, a request for content; receive, from the server, a nonce; sign the nonce with the private key; send, to the server: the token; and the signed version of the nonce; and receive, in response to the token and the signed version of the nonce, the content.

(CRM11) A computer-readable media as described in paragraph (CRM10) wherein the token comprises a fingerprint of the public key.

(CRM12) A computer-readable media as described in paragraph (CRM11) wherein the fingerprint comprises an identifier of the public key.

(CRM13) A computer-readable media as described in paragraph (CRM10) wherein the device information uniquely identifies an operating system of the user device.

(CRM14) A computer-readable media as described in paragraph (CRM10) wherein the device information uniquely identifies one or more of: a model of the user device, or a manufacturer of the user device.

(CRM15) A computer-readable media as described in paragraph (CRM10) wherein the instructions, when executed, cause the user device to send the device registration by causing the user device to send the device registration via a first Uniform Resource Locator (URL), and wherein sending the request for content comprises accessing a second URL.

(CRM16) A computer-readable media storing instructions that, when executed by one or more processors of a server, cause the server to receive from a user device, and via a first Uniform Resource Locator (URL), a device registration comprising: authentication credentials; device information of the user device; and a public key; generate, based on the authentication credentials and based on the device information, a unique device identifier; generate a fingerprint of the public key; generate a token based on the authentication credentials, the unique device identifier, and the fingerprint of the public key; send, to the user device and based on a determination, based on the device information, that the user device is of a permitted device type, the token; receive, from the user device, a request for content at a second URL; generate a random nonce; send, to the user device, the random nonce; receive, from the user device: the token; and a signed version of the nonce, wherein the signed version of the nonce was signed using a private key corresponding to the public key; and determine, based on the token, based on the unique device identifier, and based on processing the signed version of the nonce using the public key, whether to provide the user device access to the content.

(CRM17) A computer-readable media as described in paragraph (CRM16) wherein the instructions, when executed, cause the server to determine whether to provide the user device access to the content by causing the server to: determine that the signed version of the nonce was not signed using the private key; and preventing the user device from accessing the content.

(CRM18) A computer-readable media as described in paragraph (CRM16) wherein the instructions, when executed, cause the server to determine whether to provide the user device access to the content by causing the server to: prevent the user device from accessing the content based on a determination that the unique device identifier is not stored by a database.

(CRM19) A computer-readable media as described in paragraph (CRM16) wherein the instructions, when executed, cause the server to: store the public key for a period of time; and delete the public key after the period of time.

(CRM20) A computer-readable media as described in paragraph (CRM16) wherein the fingerprint is an identifier of the public key.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a server and from a user device, a device registration including:
authentication credentials,
first device information, for the user device, usable to identify a first plurality of applications executing on the user device at a first time, and
a public key;
generating, based on the first device information, a token;
sending, to the user device, the token;
receiving, from the user device, a request for content;
sending, to the user device, a nonce;
receiving, from the user device:
a second token, wherein the second token is a modified version of the token that indicates second device information, for the user device, usable to identify a second plurality of applications executing on the user device at a second time, wherein the second plurality of applications is different from the first plurality of applications; and
a signed version of the nonce, wherein the signed version of the nonce was signed using a private key corresponding to the public key; and
determining, based on comparing the token and the second token, based on determining whether a difference between the first plurality of applications and the second plurality of applications indicates an attempt at unauthorized access to the content, and based on processing the signed version of the nonce using the public key, to provide the user device access to the content.

2. The method of claim 1, wherein generating the token comprises:
generating a fingerprint of the public key, wherein the token comprises an indication of the fingerprint.

3. The method of claim 1, wherein comparing the token and the second token comprises:
determining the difference between the first plurality of applications and the second plurality of applications.

4. The method of claim 1, wherein determining whether to provide the user device access to the content comprises a determination, based on the first device information, that the user device is of a device type permitted to access the content.

5. The method of claim 1, wherein determining whether to provide the user device access to the content comprises:
determining that the signed version of the nonce was not signed using the private key; and
preventing the user device from accessing the content.

6. The method of claim 1, further comprising:
generating, based on the authentication credentials and the first device information, a unique identifier.

7. The method of claim 6, wherein determining whether to provide the user device access to the content comprises:
preventing the user device from accessing the content based on a determination that the unique identifier is not stored by a database.

8. The method of claim 1, wherein the device registration is received via a first Uniform Resource Locator (URL), and wherein the request for content is associated with access, by the user device, of a second URL.

9. The method of claim 1, further comprising:
storing, by the server, the public key for a period of time; and
deleting the public key after the period of time.

10. A method comprising:
generating, by a user device, a public key and a corresponding private key;
sending, to a server, a device registration comprising:
authentication credentials;
first device information, for the user device, usable to identify a first plurality of applications executing on the user device at a first time; and
the public key;
receiving, from the server, a token, wherein the token was generated based on:
the authentication credentials, and
the first device information;
sending, to the server, a request for content;
receiving, from the server, a nonce;
signing the nonce with the private key;
modifying the token to indicate second device information, for the user device, usable to identify a second plurality of applications executing on the user device at a second time, wherein the second plurality of applications is different from the first plurality of applications;
sending, to the server:
the modified token; and
the signed version of the nonce; and
receiving, in response to the modified token and the signed version of the nonce and based on a determination that a difference between the first plurality of applications and the second plurality of applications indicates an attempt at unauthorized access to the content, the content.

11. The method of claim 10, wherein the token comprises a fingerprint of the public key.

12. The method of claim 11, wherein the fingerprint comprises a portion of the public key.

13. The method of claim 10, wherein the first device information further indicates an operating system of the user device.

14. The method of claim 10, wherein the first device information further indicates one or more of:
a model of the user device, or
a manufacturer of the user device.

15. The method of claim 10, wherein sending the device registration comprises sending the device registration via a first Uniform Resource Locator (URL), and wherein sending the request for content comprises accessing a second URL.

16. A method comprising:
receiving, by a server, from a user device, and via a first Uniform Resource Locator (URL), a device registration comprising:
authentication credentials;
first device information, for the user device, usable to identify a first plurality of applications executing on the user device at a first time; and
a public key;
generating, based on the authentication credentials and based on the first device information, a unique device identifier;
generating a fingerprint of the public key;
generating a token based on the authentication credentials, the unique device identifier, the first device information, and the fingerprint of the public key;
sending, to the user device and based on a determination, based on the first device information, that the user device is of a permitted device type, the token;
receiving, from the user device, a request for content at a second URL;

generating a random nonce;
sending, to the user device, the random nonce;
receiving, from the user device:
- a second token, wherein the second token is a modified version of the token that indicates second device information, for the user device, usable to identify a second plurality of applications executing on the user device at a second time, wherein the second plurality of applications is different from the first plurality of applications; and
- a signed version of the nonce, wherein the signed version of the nonce was signed using a private key corresponding to the public key; and determining, based on comparing the token and the second token, based on determining whether a difference between the first plurality of applications and the second plurality of applications indicates an attempt at unauthorized access to the content, based on the unique device identifier, and based on processing the signed version of the nonce using the public key, to provide the user device access to the content.

17. The method of claim 16, wherein determining whether to provide the user device access to the content comprises:
- determining that the signed version of the nonce was not signed using the private key; and
- preventing the user device from accessing the content.

18. The method of claim 16, wherein determining whether to provide the user device access to the content comprises:
- preventing the user device from accessing the content based on a determination that the unique device identifier is not stored by a database.

19. The method of claim 16, further comprising:
- storing, by the server, the public key for a period of time; and
- deleting the public key after the period of time.

20. The method of claim 16, wherein comparing the token and the second token comprises:
- determining the difference between the first plurality of applications and the second plurality of applications.

* * * * *